Sept. 19, 1933.   C. A. COMPTON   1,927,229

OIL FILTER FOR AUTOMOBILES AND THE LIKE

Filed June 28, 1930

INVENTOR.
CHARLES A. COMPTON.
BY Munn & Co.
ATTORNEYS.

Patented Sept. 19, 1933

1,927,229

UNITED STATES PATENT OFFICE 1,927,229

OIL FILTER FOR AUTOMOBILES AND THE LIKE

Charles A. Compton, Menlo Park, Calif.

Application June 28, 1930. Serial No. 464,612

3 Claims. (Cl. 210—165)

My invention relates to improvements in oil filters for automobiles and the like, and it consists in the combinations, constructions and arrangements hereinafter described and claimed.

An object of my invention is to provide an oil filter for automobiles that is extremely simple in construction and which makes use of a baffle plate used in combination with the filtering means so as to slow up the flow of oil and cause heavy foreign particles such as small bits of metal to drop from the oil to the bottom of the device by gravity. The oil is then passed through the filtering means, and all of the foreign particles are removed as the oil passes through the filtering means.

Other objects and advantages will appear as the specification proceeds, and the novel features of the device will be particularly pointed out in the claims hereto annexed.

My invention is illustrated in the accompanying drawing, in which.

Figure 1:
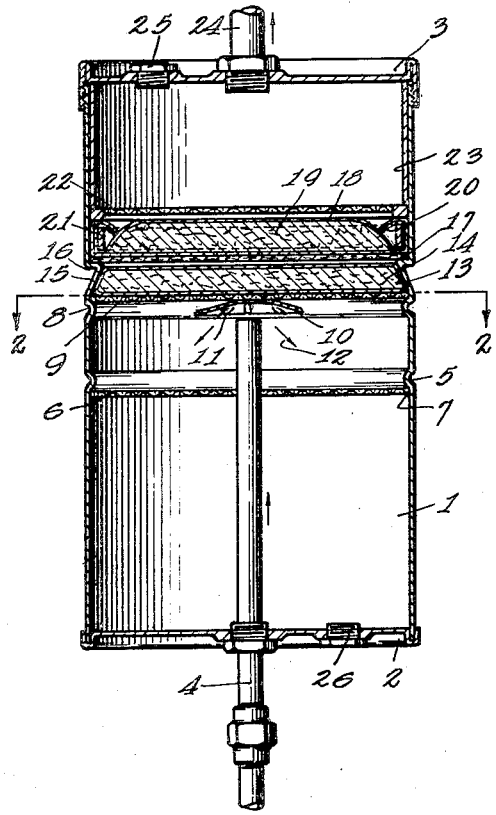
Figure 1 is a vertical section through the device.
Figure 2:
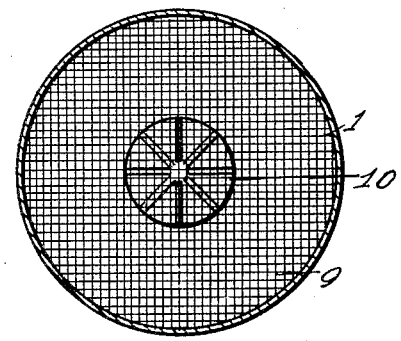
Figure 2 is a section along the line 2—2 of Figure 1.

In carrying out my invention I make use of a casing indicated generally at 1, this casing being provided with a bottom 2 and a removable top 3. An oil inlet pipe 4 enters through the bottom 2 and terminates midway between the top and bottom of the casing.

A bead 5 is formed in the side wall of the housing 1, and a screen 6 is pressed up against the bead and is secured in place by any suitable means such as solder 7. A second bead 8 is formed in the housing wall 1, and a screen 9 is placed upon the bead. It will be noted from Figure 1 that the pipe 4 passes through the screen 6 but terminates short of the screen 9. A disc-shaped baffle 10 is carried by the under-side of the screen 9 and is disposed directly above the open end of the pipe 4. The baffle may be provided with radial grooves 11 for the purpose of deflecting the oil in a radial direction away from the baffle.

Arrows 12 shown in Figure 1 indicate how the oil is forced downwardly and in a radial direction from the open end of the pipe 4. If the casing 1 is empty, the oil will pass through the screen 6 and will fill up the lower portion of the casing. After the casing has been filled up to the point of the screen 9, additional oil entering the casing from the pipe 4 will be directed downwardly but will not pass to the bottom of the casing. The result of this downward movement of oil will cause it to slow up before it passes upwardly through a filtering means hereinafter described, and this slowing up of the oil will permit small particles of metal and other heavy pieces of foreign matter to gravitate out and to drop to the bottom 2 of the casing.

The filtering means is identical to the filtering means described in my co-pending application Serial No. 464,611 filed June 28, 1930. This filtering means consists of the screen 9, a cloth filter 13 disposed above the screen and enclosing the cotton 14 in a fluffy state. The wall of the housing 1 is bent inwardly at 15 for forming a wedge for receiving the filter cloth 13. A shoulder 16 is also formed in the housing 1, and this carries a filter cloth 17 preferably made of flannel.

Above the cloth 17 I dispose another filter cloth 18 housing cotton fluff 19, but the cloth 18 has a flange 20 that is wrapped around a spring ring 21. The ring forces the flange against the inner surface of the housing 1 and tends to prevent oil from seeping between the filter 19 and the housing wall. It should also be noted that the inclined portion 15 directs the oil toward the center of the housing 1 and causes it to pass through the filtering means 19 instead of passing by the marginal edges of this means.

On top of the filter cloth 18 I dispose a screen 22, and this screen is held in place by a sleeve 23 which in turn is secured in place by the cover 3.

The cover 3 has an outlet pipe 24 and a plug 25. The bottom 2 has a plug 26. Both of these plugs may be removed and gasoline forced through the device for cleaning the filters and for cleaning out the foreign matter from the bottom of the device.

From the foregoing description of the various parts of the device, the operation thereof may be readily understood.

The device may be disposed in the oiling system of the car so that the oil from the engine will pass through the pipe 4 while the oil leading to the engine will pass through the pipe 24. The oil in passing through the device will be cleansed of heavy foreign particles by the action of the baffle plate 10, and it will further be cleaned from small particles of foreign matter by the filtering means already described.

Although I have shown and described one embodiment of my invention, it is to be understood that the same is susceptible of various changes, and I reserve the right to employ such changes as may come within the scope of the claims hereto annexed.

I claim:

1. An oil filter for automobiles comprising a casing, an oil inlet pipe extending into the casing, an oil deflecting member having radially extending grooves disposed at the outlet of the pipe and concentrically with the latter for directing the oil toward the bottom of the casing, a screen placed between the deflecting member and the casing bottom, an oil outlet pipe disposed above the deflecting member, and filtering members disposed between the deflecting member and the outlet pipe.

2. An oil filter for automobiles comprising a casing, an oil inlet pipe extending into the casing, an oil deflecting member disposed at the outlet of the pipe for directing the oil toward the bottom of the casing, a screen placed between the deflecting member and the casing bottom, an oil outlet pipe disposed above the deflecting member, filtering members disposed between the deflecting member and the outlet pipe, said casing having an inwardly inclined portion disposed adjacent to the filtering members for directing the oil away from the marginal edges of the filtering members and toward the centers of the latter, and means for holding the top filtering member against the casing wall for preventing the passage of oil past the marginal edges of this filter.

3. An oil filter comprising a casing, a vertically-extending and centrally disposed inlet pipe entering the bottom of the casing and projecting into the casing a predetermined distance, a screen disposed below the outlet of the pipe an oil deflector disposed above the pipe and having radially extending grooves for directing the oil equally in all directions toward the screen and the bottom of the casing, an oil filter disposed above the pipe and extending across the casing, and an outlet pipe leading from the top of the casing.

CHARLES A. COMPTON.